US007036823B2

(12) United States Patent
Takiguchi et al.

(10) Patent No.: US 7,036,823 B2
(45) Date of Patent: May 2, 2006

(54) SIDE RAIL AND COMBINED OIL CONTROL RING INCORPORATED WITH THE SIDE RAILS FOR REDUCTION OF OIL CONSUMPTION

(75) Inventors: Katsumi Takiguchi, Kashiwazaki (JP); Kazunori Kusama, Kashiwazaki (JP)

(73) Assignee: Riken Corporation, Tokyo (JP)

( * ) Notice: Subject to any disclaimer, the term of this patent is extended or adjusted under 35 U.S.C. 154(b) by 101 days.

(21) Appl. No.: 10/467,549

(22) PCT Filed: Dec. 25, 2002

(86) PCT No.: PCT/JP02/13532

§ 371 (c)(1),
(2), (4) Date: Aug. 7, 2003

(87) PCT Pub. No.: WO03/058096

PCT Pub. Date: Jul. 17, 2003

(65) Prior Publication Data

US 2004/0061291 A1 Apr. 1, 2004

(30) Foreign Application Priority Data

Dec. 28, 2001 (JP) ............................ 2001-400002

(51) Int. Cl.
*F02F 5/00* (2006.01)

(52) U.S. Cl. ...................................... 277/434; 277/467

(58) Field of Classification Search ................ 277/434, 277/435, 467
See application file for complete search history.

(56) References Cited

U.S. PATENT DOCUMENTS 2,713,527 A * 7/1955 Hsia-Si ........................ 277/481
2,817,564 A * 12/1957 Marien ........................ 277/480
2,882,108 A * 4/1959 Marien ........................ 277/457
3,460,846 A * 8/1969 Anderson et al. ........... 277/481
3,580,589 A * 5/1971 Prasse et al. ............... 277/481
3,695,622 A * 10/1972 Davis et al. ................ 277/435
5,251,915 A * 10/1993 Meernik ..................... 277/457

* cited by examiner

*Primary Examiner*—William L. Miller
(74) *Attorney, Agent, or Firm*—Bachman & LaPointe, P.C.

(57) ABSTRACT

A side rail is formed into a ring shape having its generally rectangular section that has an outer surface 3 formed with a pair of edge surfaces 5 of small radius, and an intermediate surface 6 of large radius of curvature formed between the edge surfaces 5. When the side rail is in the inclined condition in operation, each edge surface 5 can easily ride on oil film on cylinder 16 and allow the side rail 1 to perform smooth sliding movement on the inner surface of cylinder. The intermediate surface 6 efficiently scrapes lubricating oil on cylinder to form lubricating oil film of necessary and minimum thickness between an inner surface 17 of cylinder 16 and side rail 1. Also, the larger radius of curvature for forming the intermediate surface 6 provides a larger contact area to the inner surface 17 of cylinder 16 to improve wear resistance.

6 Claims, 3 Drawing Sheets

30
FIG. 1
PRIOR ART
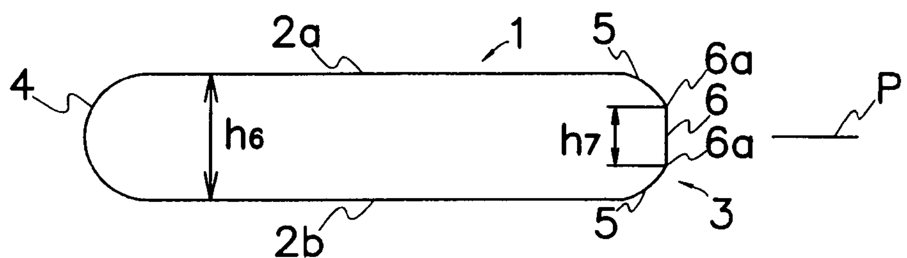
FIG. 2
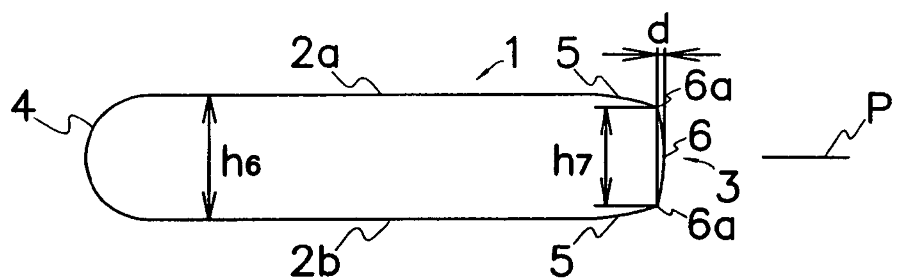
FIG. 3
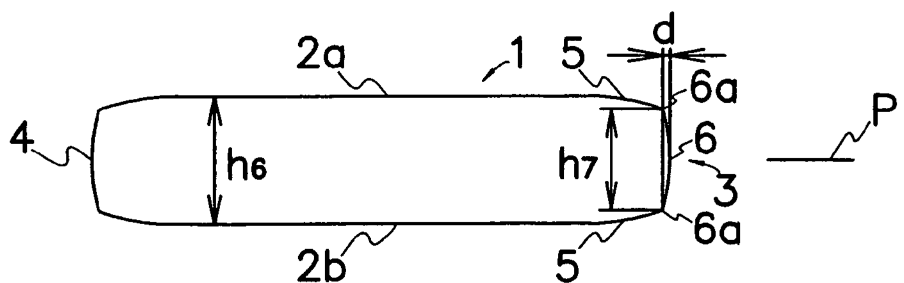
FIG. 4

SIDE RAIL AND COMBINED OIL CONTROL RING INCORPORATED WITH THE SIDE RAILS FOR REDUCTION OF OIL CONSUMPTION

This invention relates to a side rail for oil control ring used in an internal combustion engine, in particular a side rail and a combined oil control ring incorporated with the side rails demonstrating an excellent control function of lubricating oil on cylinder.

BACKGROUND OF THE INVENTION

An oil control ring is attached in a ring groove formed on a cylindrical outer surface of a piston to control lubricating oil on an inner surface of a cylinder in an internal combustion engine. A typical example of currently practical oil control rings is a combined oil control ring that comprises a spacer expander and a single or a pair of side rails attached to the spacer expander. In operation of the internal combustion engine, the side rail is retained in a ring groove of the piston, while the side rail is reciprocated in a cylinder along with the piston to cause an outer surface of the side rails to slide on the inner surface of the cylinder. At the same time, the spacer expander produces elastic force to press a side surface of the side rail on a radial surface of the ring groove and also outer surface of the side rail on the inner surface of the cylinder. As a result, the outer surfaces of the side rails serve to scrape an excessive amount of lubricating oil from inner surface of cylinder toward a crank chamber to form a lubricant film of appropriate thickness on the inner surface of cylinder and also to prevent lubricating oil from creeping or crawling up into a combustion chamber.

Usually, the oil control ring is attached to a piston in parallel to and beneath a top or second piston ring attached the upper portion of piston, and a spacer expander of the oil control ring is generally designated to produce a higher pressing force on inner wall of cylinder than that of the top or second ring, providing the oil control ring with stronger tension. Since it has been required that friction force between piston rings and inner wall of cylinder is decreased in order to reduce fuel consumption, the tension of spacer expander has recently been designated to be smaller. Simultaneously, oil control rings are advisable to have a close followability or matching distortion to a deformed inner surface of cylinder during operation. Accordingly, smaller tension of the spacer expander would be desirable for nimble reciprocal movement of the piston but on the other hand such a spacer expander may result in increase of lubricant consumption because it deteriorates followability in operation of the side rail to cylinder, and therefore, the outer surface of the side rail does not keep close sliding contact to the deformed inner surface of cylinder. Accordingly, there is a tendency of demanding thinner ring width in recent oil control rings that can keep good followability of side rails to inner surface of cylinder under lowered tension of spacer expander.

For example, Japanese Patent Disclosure No. 6-272763 discloses an efficient manufacture of flat wires of high alloy steel without cracks as ring materials of side rails for oil control rings. In manufacture, steel wires are forced into a circular cross section by cold drawing or warm drawing, and then formed into flat wires of thickness less than 1 mm through cold rolling or warm rolling so that the resultant flat wire has the flat side surfaces and barrel-shaped surfaces formed between the flat side surfaces. The flat wires are further formed into a coiled shape with great circular accuracy and cut into ring materials with the barrel-shaped outer and inner surfaces effective to form oil film of appropriate thickness on inner surface of cylinder.

Also, Japanese Patent Disclosure No. 2000-320672 demonstrates a combined oil control ring of thin three-piece type that produces a lower tension with good follow-up performance to unevenly deformed cylinder surface to improve airtight property. The combined oil control ring comprises a spacer expander and two side rails attached to the spacer expander in axially spaced relation to each other wherein axial distance between outer tips of the upper and lower side rails is shorter than axial distance between imaginary central planes passing through the upper and lower side rails to improve mating distortion or followability of the side rails to deformed inner surface of cylinder in operation, but it does not produce any practical effect to better the followability.

During upward stroke of piston in operation, the outer side surface of the side rail produces a frictional force on inner surface of cylinder in an adverse direction to the moving direction of piston so that the oil control ring is moved in the ring groove toward a crank chamber. At this moment, the lower side rail is in contact to and in parallel relation to a bottom surface of the ring groove, and the lower side rail is in contact to inner surface of cylinder at a substantially central portion of the barrel-shaped outer surface, while frictional force slants the upper side rail toward the crank chamber due to clearance between the oil control ring and ring groove, and deformation of the spacer expander. Accordingly, the upper side rail is brought into contact to the inner surface of cylinder at an upper point above a central portion in thickness of the outer surface.

During downward stroke of piston, the oil control ring is moved in the ring groove toward a combustion chamber, and as a result, the upper side rail is in contact to and in parallel relation to a top surface of the ring groove, and the upper side rail is in contact to the inner surface of cylinder at a substantially central portion of the barrel-shaped outer surface, while the lower side rail is brought into contact to the inner surface of cylinder at a lower point below a central portion in thickness of the outer surface.

Although the side rail comes into contact to the inner surface of cylinder under elastic force of spacer expander, it is believed that the round outer surface of the side rail can neither always produce oil film of suitable thickness on inner surface of cylinder in the inclined and non-inclined conditions of the side rail nor scrape up and down sufficient amount of lubricating oil from inner surface of cylinder. In particular, when the oil control ring is incorporated with side rails of lower tension for reducing pressing force of side rails on inner surface of cylinder, it has been found that the oil control ring would increase oil consumption.

An object of the present invention is to provide a side rail capable of performing a good oil control function under lower tension set for an oil control ring. Another object of the present invention is to provide an oil control ring assembled with such side rails under lower tension. Still another object of the present invention is to provide a side rail and combined oil control ring capable of reducing consumption of lubricating oil and fuel in internal combustion engine.

SUMMARY OF THE INVENTION

A side rail (1) according to the present invention is formed into a ring shape having its generally rectangular section that comprises a pair of side surfaces (2*a*, 2*b*) in parallel to each other, an outer surface (3) formed between two outer peripheries of the side surfaces (2*a*, 2*b*) for contact to an inner surface (17) of a cylinder (16), and an inner surface (4) formed between two inner peripheries of the side surfaces (2*a*, 2*b*) for contact to a spacer expander (10) of the oil control ring. The outer surface (3) comprises a pair of edge surfaces (5) connected to the adjacent side surfaces (2*a*, 2*b*), and an intermediate surface (6) formed between the edge surfaces (5). The edge surface (5) is formed with a smaller radius than that of a prior art barrel-shaped surface (30) so that the edge surface (5) can easily ride on oil film on cylinder (16) in the inclined condition of the side rail (1) in operation and allow the side rail (1) to perform smooth sliding movement on the inner surface (17) of cylinder (16). The intermediate surface (6) is formed with a greater radius of curvature than that of the prior art barrel-shaped surface (30) to efficiently scrape lubricating oil on cylinder (16) when the side rail (1) is in the non-inclined condition, thereby forming lubricating oil film of necessary and minimum thickness between the inner surface (17) of cylinder (16) and side rail (1). Also, the larger radius of curvature for forming the intermediate surface (6) provides a larger contact area to the inner surface (17) of cylinder (16) to improve wear resistance.

BRIEF DESCRIPTION OF THE DRAWINGS

A more complete understanding of the present invention may be derived by reference to the detailed description and the claim when considered together with the accompanying drawings wherein:

FIG. 1 is a sectional view of a prior art side rail.

FIG. 2 is a sectional view of a preferred embodiment of a side rail according to the present invention.

FIG. 3 is a sectional view of another embodiment of the side rail according to the present invention.

FIG. 4 is a sectional view of still another embodiment of the side rail according to the present invention.

DETAILED DESCRIPTION OF THE INVENTION

Figure 5:
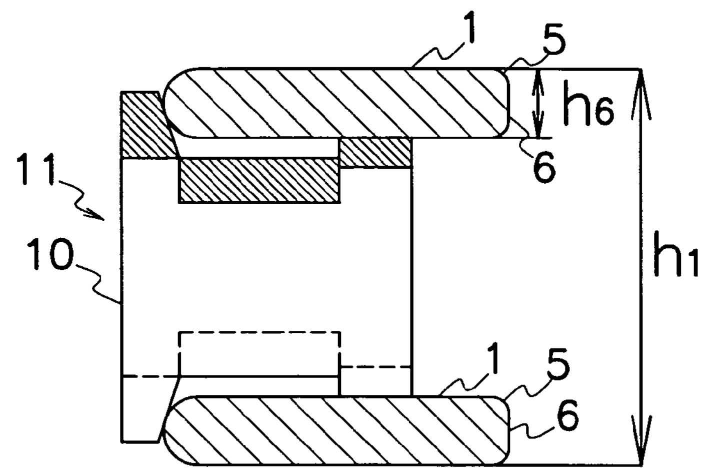
FIG. 5 is a sectional view of the oil control ring assembled with the side rails according to the present invention.

Embodiments of the present invention will be described hereinafter in connection with the accompanied drawings.

As shown in FIG. 1, a prior art side rail has been contoured with barrel-shaped outer and inner surfaces 30 even though they have been provided with surface modification for improvement of sliding performance. Conveniently, the barrel-shaped surfaces 30 can coincidentally be formed upon rolling of steel wires into flat section to cause the outer and inner surfaces 30 to radially expand into a barrel shape of substantially constant radius of curvature.

As shown in FIG. 2, the side rail according to the present invention is formed into a ring shape having its generally rectangular section that comprises a pair of radial side surfaces 2*a*, 2*b* in parallel to each other, an outer circumferential surface 3 formed between two outer peripheries of the side surfaces 2*a*, 2*b*, and an inner circumferential surface 4 formed between two inner peripheries of side surfaces 2*a*, 2*b*.

Each of edge surfaces 5 is formed with a radius that is substantially equal to from one fifth (1/5) to eight fifth (8/5) of side rail width $h_6$. Intermediate surface 6 is formed with a cylindrical surface of substantially constant radius or with a barrel face of substantially constant radius of curvature greater than radius of curvature for the edge surfaces 5. Axial length of intermediate surface 6 is in a range between about 30% and about 70% of side rail width $h_6$.

Each edge surface 5 cannot be formed with a radius less than one fifth of side rail width $h_6$, because such a small curvature of edge surface cannot be drawn by die, and radius of each edge surface 5 more than eight fifth of the side rail width $h_6$ cannot generate an appropriate oil film because the radius would provide a sharp annular edge on a boundary portion 6*a* between each edge surface 5 and intermediate surface 6. When axial length $h_7$ of intermediate surface 6 is less than about 30% of side rail width $h_6$, intermediate surface 6 produces sufficient scraping function in downward and upward strokes of piston 12, resulting in increased oil consumption. When axial length $h_7$ of intermediate surface 6 is over about 70% of side rail width $h_6$, edge surfaces 5 of upper side rail 1 do not contact inner surface 17 of cylinder 16 during upward movement of piston 12 although side rail 1 is inclined up to the maximum tilt angle. Thus, lubricating oil is scraped up by intermediate surface 6 or flat surface in the vicinity of edge surface 5 resulting in increased oil consumption.

As shown in FIG. 5, a pair of side rails 1 cooperate with a spacer expander 10 to form a combined oil control ring 11. The barrel-shaped surface 30 is further rolled or pressed to form the outer surface 3 that includes a pair of edge surfaces 5 connected to the adjacent side surfaces 2*a*, 2*b*, and an intermediate surface 6 arranged between the edge surfaces 5 on an inside or intermediate portion of the outer surface 3. Intermediate surface 6 is configured by a cylindrical surface of a constant radius or slightly convex and curved surface with large radius of curvature. End surfaces 5 are vestiges of distended or inflated barrel-shaped surface originally formed by rolling, however, they are perfectly reformed into curved surfaces of smaller radius of curvature than that of barrel-shaped surface 30. As shown in cross section of FIG. 2, a boundary portion 6*a* is formed between intermediate surface 6 and each edge surface 5 with a continuously curved surface of a single arc or combined arcs in cross section so that the curved surface is tangent to both edge surfaces 5 and intermediate surface 6 to define a smooth and uninterrupted connecting surface through boundary portion 6*a*. Alternatively, in this embodiment, the boundary portion 6*a* may be of a discontinuous ringed line between not so sharpened edges of edge and intermediate surfaces 5 and 6.

Side rail width $h_6$ may be in a range between about 0.3 mm to about 0.65 mm because the side rail does not have a sufficient mechanical strength with width $h_6$ of side rail less than 0.3 mm, and width $h_6$ of side rail over 0.65 mm deteriorates followability of the oil control ring to inner surface 17 of cylinder 16 under lower tension of the oil control ring, resulting in increase of oil consumption. Similarly to outer surface 3, inner surface 4 also is formed by rolling process to radially inflate or expand into a barrel shape with a radius of substantially half of side rail width $h_6$, and then side rails may be attached to a spacer expander after the rolling process without further forming of inner surface 4. However, as shown in FIG. 3, a mirror image shape of or similar shape to outer surface 3 may be applied to inner surface 4 for easy handling of rolled materials in manufacture or for avoidance of erroneous attachment of rolled materials to coiling machine.

Figure 6:
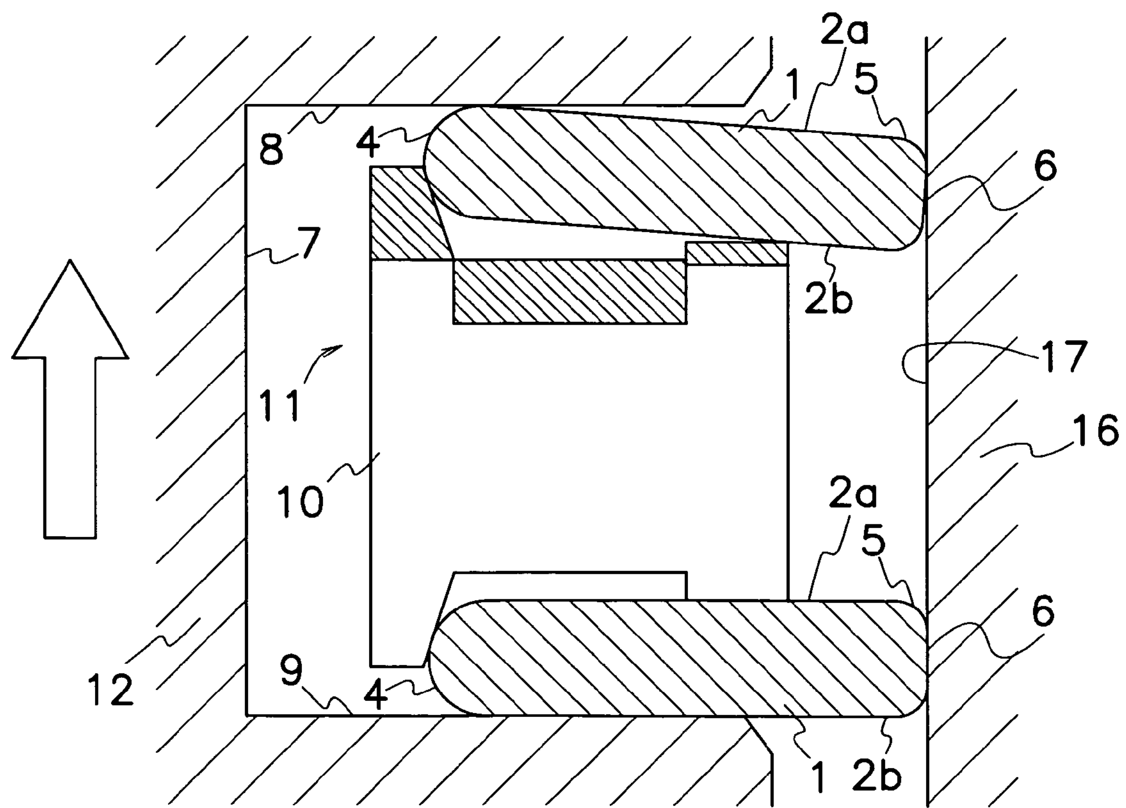
FIG. 6 is a sectional view of an oil control ring assembled with the side rails according to the present invention when a piston with the oil control ring is in an upward stroke.

As illustrated in FIG. 6, the side rails are attached to a spacer expander 10 to assemble an oil control ring 11 in a ring groove 7 of piston 12. Upper side rail 1 is resiliently pressed toward a top radial surface 8 of ring groove 7 and also toward inner surface 17 of cylinder 16 under elastic force of spacer expander 10. Lower side rail 1 is resiliently pressed toward a bottom radial surface 9 of ring groove 7 and also toward inner surface 17 of cylinder 16 under elastic force of spacer expander 10.

In the embodiment shown in FIG. 2, intermediate surface 6 is formed into a cylindrical surface of substantially constant radius between a pair of edge surfaces 5 with axial length of intermediate surface 6 in a range between about 30% and about 70% of the side rail width $h_6$. Another embodiment of FIG. 3 demonstrates an intermediate surface 6 formed with a barrel-shaped convex or bulge slightly outwardly radially protruding from connections or boundary portions 6*a* of intermediate surface 6 and each edge surface 5 by a height equal to or less than about 0.01 mm. Convex of intermediate surface 6 with projection over 0.01 mm deteriorates scraping function of lubricating oil by intermediate surface 6. Outer surface 3 is formed into a mirror image with upper and lower edge surfaces 5 symmetrically of a central imaginary plane P passing through a center of intermediate surface 6 so that the side rail can correctly be attached to spacer expander 10 although it is turned over.

During upward stroke of piston 12 in operation, outer surface 3 of upper side rail 1 is in contact to inner surface 17 of cylinder 16 and simultaneously outer surface 3 of upper side rail 1 is moved toward crank chamber due to frictional force produced between outer surface 3 of upper side rail 1 and inner surface 17 of cylinder 16 and also due to clearance between oil control ring and ring groove 7 and deformation of spacer expander 10 so that upper side surface 2*a* of upper side rail 1 is forcibly separated away from top surface 8 of ring groove 7 against elastic force of spacer expander 10 as shown in FIG. 6. Consequently, upper side rail 1 moves upwardly in the inclined condition with outer surface 3 in the late and lowered condition while only upper edge surface 5 keeps sliding contact to cylinder 16. Accordingly, upper edge surface 5 of upper side rail 1 is maintained in an attitude to easily ride on oil film on cylinder 16 and serves to form oil film of sufficient thickness between upper edge surface 5 and cylinder 16, scraping less amount of lubricating oil by upper edge surface 5.

At this moment, lower side rail 1 is retained in contact to bottom surface 9 of ring groove 7 without tilting movement of lower side rail 1 as largely as upper side rail 1 does, and lower side rail 1 is in contact to cylinder 16 at the substantially central portion of generally flat intermediate surface 6 to efficiently and effectively scrape lubricating oil on cylinder 16 and produce lubricating oil film of necessary minimum thickness. Oil scraped by lower side rail 1 is supplied to crank chamber through openings (not shown) in spacer expander 10 and passages (not shown) from ring groove 7 to crank chamber.

Figure 7:
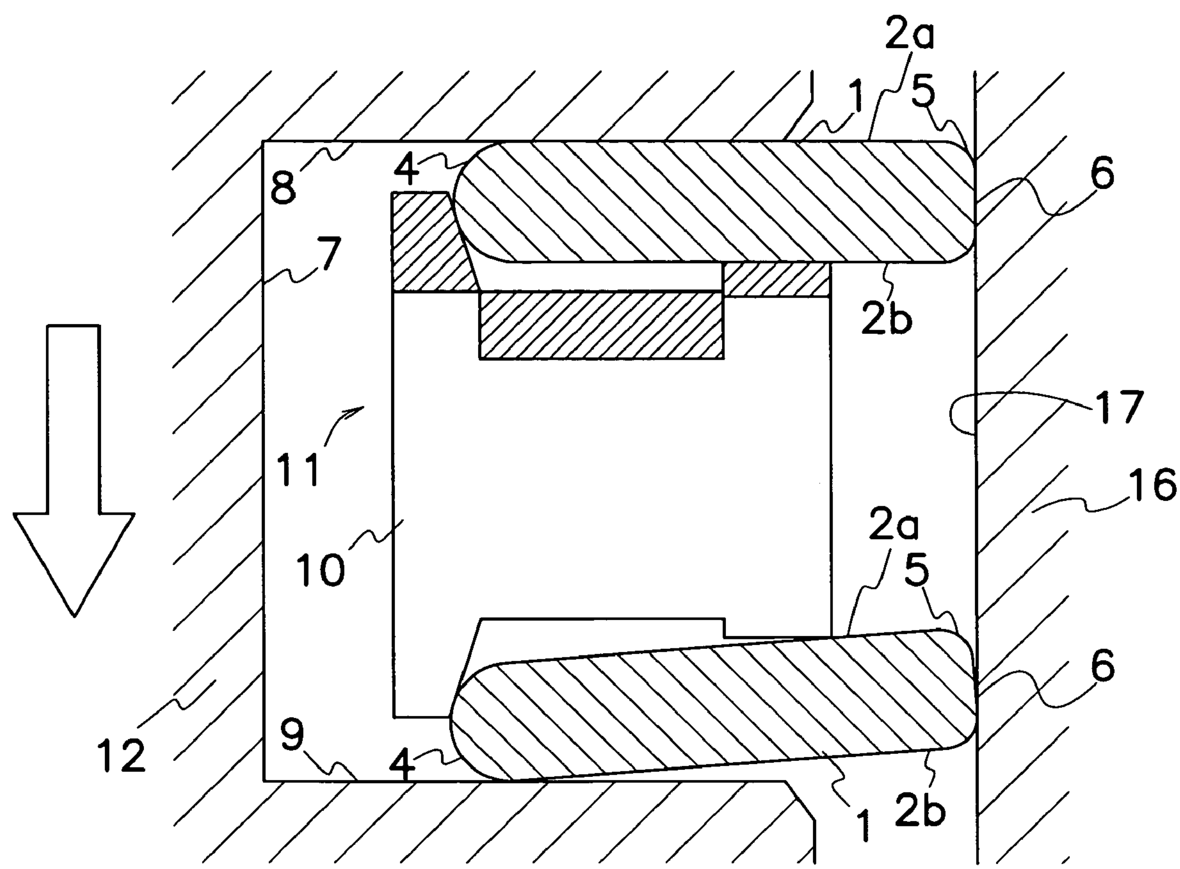
FIG. 7 is a sectional view of the oil control ring when the piston is in a downward stroke.

During downward stroke of piston 12, outer surface 3 of lower side rail 1 is in contact to inner surface 17 of cylinder 16 and simultaneously is moved in ring groove 7 toward combustion chamber due to frictional force produced between outer surface 3 of lower side rail 1 and inner surface 17 of cylinder 16 and also due to clearance between oil control ring and ring groove 7 and deformation of spacer expander 10 so that bottom side surface 2*b* of lower side rail 1 is forcibly separated away from bottom surface 9 of ring groove 7 against elastic force of spacer expander 10 as shown in FIG. 7. Consequently, lower side rail 1 moves downwardly in the inclined condition with outer surface 3 in the late and raised condition while only lower edge surface 5 of lower side rail 1 keeps sliding contact to cylinder 16. Accordingly, lower edge surface 5 of lower side rail 1 is kept in an attitude to easily ride on oil film and serves to form oil film of sufficient thickness between lower edge surface 5 and cylinder 16, scraping less amount of lubricating oil by lower edge surface 5.

At this moment, upper side rail 1 is retained in contact to top surface 8 of ring groove 7 without tilting movement of upper side rail 1 as largely as lower side rail 1 does, and upper side rail 1 is in contact to cylinder 16 at the substantially central portion of generally flat intermediate surface 6 to efficiently and effectively scrape lubricating oil on cylinder 16 and produce lubricating oil film of necessary minimum thickness. Oil scraped by upper side rail 1 is supplied to crank chamber through openings in spacer expander 10 and passages from ring groove 7 to crank chamber.

In this way, upper or lower side rail 1 moves in ring groove 7 in the inclined condition away from top surface 8 or bottom surface 9 of ring groove 7 during upward or downward stroke of piston 12 to bring the foregoing edge surface 5 of preceding side rail 1 into sliding contact to cylinder 16 through oil film for good followability of side rail 1. Simultaneously, intermediate surface 6 of the following side rail 1 scrapes a sufficient amount of lubricating oil from cylinder 16 to restrict lubricating oil loss into combustion chamber for reduction of oil consumption.

The present invention may be applied to at least one of side rails assembled in a combined oil control ring to save lubricating oil, but it would naturally be advisable to apply the instant invention to both or all of side rails in oil control ring and thereby to attain full reduction of oil consumption. It would also be desirable to use upper and lower side rails of same type in order to prevent erroneous attachment of side rails without their assembled direction.

The inventors performed oil consumption tests to verify effects of the side rails according to the present invention utilizing an actual engine with water cooled 4 cylinders of displacement 1800 cc that was worked for each ten hours with 6000 rpm-WOT (Wide Open Throttle). The side rails according to the present invention were prepared to have the profile of cross section shown in FIG. 2, and assembled to the oil control ring depicted in FIG. 5 all with ring width $h_1$ of 2.0 mm and rail width $h_6$ of 0.3 mm to 0.5 mm. Top ring was made of martensitic stainless steel with nitrided outer surface 3, and second ring was made of cast iron with tapered outer surface. The first and second rings were exchanged every test. All of assembled oil control rings had the nominal diameter of 79 mm with ring width $h_1$ of 2.0 mm. Used spacer expanders had the axially corrugated structure to produce a combined tension of about 20 N. Upper and lower side rails had three types of rail width $h_6$ selected from 0.3 mm, 0.4 mm and 0.5 mm. After side rails were coiled into an exact circular shape, outer side surfaces 3 were lapped to form flat intermediate surface 6 with six types of ring width $h_7$: about 20%, about 30%, about 40%, about 50%, about 60% and about 70%. Following table indicates the test results of oil consumption: $O_c$ with flatness: $P_r=h_6/h_7$ wherein oil consumption rate of prior art side rails is shown as comparative "1". In a similar manner, prior art side rails with barrel-shaped outer surfaces were prepared and tested as Sample Nos. 1, 8 and 15 all with flatness $P_r$ being zero.

Test results shown in table reveal that the combined oil control rings incorporated with the side rails of Sample Nos. 3 to 7, 10 to 14 and 17 to 21 are superior in reducing consumption of lubricating oil to those with side rails of Sample Nos. 1, 2, 8, 9, 15 and 16, and that consumption of lubricating oil is increased when width $h_7$ of intermediate surface 6 is beneath 30% of side rail width $h_6$.

TABLE

| $h_6$(mm) | No. | $P_r$(%) | $O_c$ | $h_6$(mm) | No. | $P_r$(%) | $O_c$ |
|---|---|---|---|---|---|---|---|
| 0.5 | 1 | 0 | 1 | 0.4 | 12 | 50 | 0.6 |
| | 2 | 20 | 1.0 | | 13 | 60 | 0.6 |
| | 3 | 30 | 0.8 | | 14 | 70 | 0.7 |
| | 4 | 40 | 0.7 | 0.3 | 15 | 0 | 0.75 |
| | 5 | 50 | 0.7 | | 16 | 20 | 0.7 |
| | 6 | 60 | 0.7 | | 17 | 30 | 0.6 |
| | 7 | 70 | 0.8 | | 18 | 40 | 0.5 |
| 0.4 | 8 | 0 | 0.9 | | 19 | 50 | 0.5 |
| | 9 | 20 | 0.8 | | 20 | 60 | 0.5 |
| | 10 | 30 | 0.7 | | 21 | 70 | 0.6 |
| | 11 | 40 | 0.6 | | | | |

As mentioned above, the present invention can provide thinner side rails with edge surfaces and intermediate surface that are brought into contact to inner surface of cylinder when the side rail is in the inclined and non-inclined normal conditions, achieving the following effects:

1 Edge surfaces easily ride on oil film on cylinder for smooth sliding rail;

2 Intermediate surface serves to scrape sufficient amount of lubricating oil from cylinder to form oil film of necessary and minimum thickness on cylinder;

3 Intermediate surface defines the larger contact area to cylinder to improve wear resistance;

4 The side rail with shorter width or under reduced tension performs followability well to deformed inner surface of cylinder in operation;

5 The side rail performs superior oil control function to remarkably reduce oil and fuel consumption by excellent oil scraping function and good followability of the side rail; and 6 The side rail is effective to raise performance of internal combustion engines.

The invention claimed is:

1. A side rail for use in an oil control ring, said side rail being formed into a ring shape having its generally rectangular section that comprises a pair of side surfaces in parallel to each other, an outer surface formed between two outer peripheries of said side surfaces for contact to an inner surface of a cylinder, and an inner surface formed between two inner peripheries of said side surfaces for contact to a spacer expander of said oil control ring, said outer surface comprising a pair of edge surfaces connected to said adjacent side surfaces, an intermediate surface formed between said edge surfaces and a boundary portion between each of said edge surfaces and said intermediate surface, each of said edge surfaces being formed with a radius of curvature equal to from one fifth to eight fifth of said side rail width to easily ride an oil film on a cylinder in the inclined condition of the side rail in operation and allow the side rail to perform smooth sliding movement on the inner surface of said cylinder, said intermediate surface being formed by a barrel face formed with a constant radius of curvature greater than radius of curvature for said edge surfaces, said barrel face forming a convex surface slightly outwardly protruding from said boundary portion between said intermediate surface and edge surfaces by a height equal to or less than about 0.01 mm, the radius of curvature for forming the intermediate surface providing a larger contact area to the inner surface of the cylinder, and axial length of said intermediate surface being in a range between about 30% and about 70% of the side rail width.

2. The side rail of claim 1, wherein said side rail width is in a range between about 0.3 mm to about 0.65 mm.

3. The side rail of claim 1 or 2, wherein said inner surface is formed with radius of curvature approximately half of the side rail width.

4. The side rail of claim 1 or 2, wherein said inner surface is formed into a shape same as that of said outer surface.

5. The side rail of claim 1, wherein said edge surfaces are formed with distended surfaces by rolling said side rail.

6. An oil control ring comprising a spacer expander and a pair of side rails pressed radially outwardly by said spacer expander, wherein each said side rail is according to claim 1.

* * * * *